United States Patent [19]

Schiffner

[11] 4,354,760

[45] Oct. 19, 1982

[54] RING INTERFEROMETER COMPRISING A SINGLE-MODE LIGHT WAVEGUIDE

[75] Inventor: Gerhard Schiffner, Munich, Fed. Rep. of Germany

[73] Assignee: Siemens Aktiengesellschaft, Berlin & Munich, Fed. Rep. of Germany

[21] Appl. No.: 132,142

[22] Filed: Mar. 20, 1980

[30] Foreign Application Priority Data

Mar. 21, 1979 [DE]  Fed. Rep. of Germany ........ 2911129

[51] Int. Cl.³ ............................ G01P 3/36; G01B 9/02
[52] U.S. Cl. .................................. 356/350; 350/96.15
[58] Field of Search .............................. 356/350, 73.1; 350/96.15

[56] References Cited

U.S. PATENT DOCUMENTS 4,265,541 5/1981 Leclerc et al. ...................... 356/350
4,280,766 7/1981 Goss et al. ........................... 356/350

OTHER PUBLICATIONS

Vali et al., "Fresnel-Fizeau Effect in a Rotating Optical Fiber Ring Interferometer", *Applied Optics*, vol. 16, No. 10, pp. 2605–2607, 10/77.
Stolen et al., "Linear Polarization in Birefringent Single-Mode Fibers", *Appl. Phys. Lett.*, vol. 33, No. 8, pp. 699–701, 10/78.

*Primary Examiner*—John K. Corbin
*Assistant Examiner*—Matthew W. Koren
*Attorney, Agent, or Firm*—Hill, Van Santen, Steadman, Chiara & Simpson

[57] ABSTRACT

A ring interferometer which has at least one single mode light waveguide wound in a coil characterized by the light waveguide maintaining one polarization state. If the interferometer includes directional couplers or additional light waveguides, each of these are constructed of waveguides which conduct only one polarization state.

6 Claims, 5 Drawing Figures

RING INTERFEROMETER COMPRISING A SINGLE-MODE LIGHT WAVEGUIDE

BACKGROUND OF THE INVENTION

The present invention is directed to a ring interferometer comprising a single-mode light waveguide (optical fiber) which is wound into a form of a coil. Ring interferometers of this type are based on Sagnac effect. When the wound coil of the single-mode light waveguide is rotated relative to a reference system, and light is introduced into each end of a single-mode waveguide, a non-reciprocal transit time difference will be produced in the coil and can be interferometrically established. A typical application of a ring interferometer of this type is in the field of navigation.

It has been observed that the birefringent or double refractive properties of a typical single-mode fiber, which is being used caused by minor perturbations along the fiber, can lead to difficulties. In order to eliminate these difficulties it has been proposed that polarization filters whose direction of polarization are parallel to one another, are employed between the ends of each of the single-mode fiber and any detecting devices such as photodetectors. These solutions were discussed in two copending U.S. patent applications, Ser. No. 002,615, which was filed on Jan. 11, 1979, issued as U.S. Pat. No. 4,259,016 and corresponds to German application No. P 28 04 103, and Ser. No. 021,692, which filed Mar. 19, 1979 issued as U.S. Pat. No. 4,302,107 and corresponds to German patent application No. P 28 14 476. In addition, in copending U.S. patent application Ser. No. 002,537 issued as U.S. Pat. No. 4,325,636, which was filed on Jan. 11, 1979, and is based on German application 28 04 119, an interferometer of the above mentioned type, which utilizes directional couplers, was disclosed.

SUMMARY OF THE INVENTION

The aim of the present invention is to provide a ring interferometer having a single-mode optical fiber wound in a coil and a source for coupling light into each end of the fiber which interferometer does not require polarization filters adjacent the ends of the optical fiber or adjacent the detector devices and in which small perturbations along the light waveguide cannot lead to difficulties.

The object of the present invention are realized in an improvement in a ring interferometer which includes a single-mode light waveguide wound in a coil and has means for coupling light from a source into each end and sensing light leaving each end of the waveguide. The improvement is that the single-mode light waveguide is capable of maintaining the state of polarization or conducting only one polarization state, even if perturbations are present. If optical directional couplers are utilized in the system, they can also be composed of a coupler which only couples one polarization direction. If additional optical fibers are used they also can be of a type which maintains the polarization state.

The principles of the present invention are surprisingly simple and properly and readily eliminate the difficulties which can be caused by minor perturbations of a typical fiber.

The light waveguides which maintain the state of polarization or are capable of conducting only one polarization state can consist of a fiber or of a strip conductor. Optical fibers which maintain the polarization state (linear polarization), are described by R. H. Stolen et al, "Linear Polarization in Birefringent Single-Mode Fibers", *Applied Physics Letter*, Vol. 33, No. 8, Oct. 15, 1978, pp. 699–701 and by V. Ramaswamy et al, "Single Polarization Optical Fibers: Exposed Cladding Technique", *Applied Physics Letter*, Vol. 33, No. 9, Nov. 1, 1978, pp. 814–816.

Single-mode strip waveguides on a plane substrate are well known in integrated optics and they can be designed to transmit only one state of polarization and exhibit high loss for the orthogonal state of polarization. Such waveguides have been described in the paper E. A. J. Marcatili, "Dielectric Rectangular Waveguide and Directional Coupler for Integrated Optics", Bell Systems Technical Journal, vol. 48, Sept. 1969, pp. 2071–2102.

The improvement of the present invention may be applied to all types of ring interferometer irrespective of their construction. For example, it may be applied to all embodiments of the examples described in the above mentioned three patent applications. In the embodiments in which the light fed into the coil and discharged therefrom is in free beam paths, it is essential that the light waveguide of the coil should not change the polarization state. Examples of this type of structure are illustrated in FIGS. 1, 2 and 3 in the U.S. patent application Ser. Nos. 002,615 and 021,692.

If the light in the optical circuit is fed to the coil and discharged therefrom by additionally providing light waveguides, it is expedient that these additionally provided light waveguides should maintain the state of polarization or should be able to conduct light in only one polarization state. An optical circuit of the type, is described for example in the above mentioned U.S. patent application Ser. No. 002,537 and is also described in FIG. 4 in the other two U.S. applications. This circuit also includes optical directional couplers. It is expedient for this optical directional coupler to be able to only couple one polarization state. The three alternate possibilities can be employed individually but also in arbitrary combinations with each other.

It will be obvious that the light waveguides which do not change the polarization state or the directional couplers which can couple only one polarization state are used in accordance with the construction of ring interferometers in such a manner that they will achieve the same effect that is achieved by the polarization filters which form the subject of the above mentioned earlier U.S. applications. In the subject of the earlier patent application Ser. No. 002,537, this effect is safely achieved when two conditions are met. These conditions are that the existing directional couplers can couple only one and the same polarization state and that all of the light waveguides of the optical circuit, which are provided in addition to the optical waveguide of the coil and from which the directional coupler are also constructed do not change the state of polarization or can only conduct light in the same polarization state. The light waveguide of the coil itself can also consist of a light waveguide of this type. If the light waveguides of the optical circuit are conventional light waveguides and their structure is provided for example with small curvatures and a short length so that they do not involve any fundamental disturbing effects, it is sufficient if only the light waveguide of the coil represent a light waveguide which maintains the state of polarization or can only conduct one polarization state.

DESCRIPTION OF THE PREFERRED EMBODIMENTS

Figure 1:
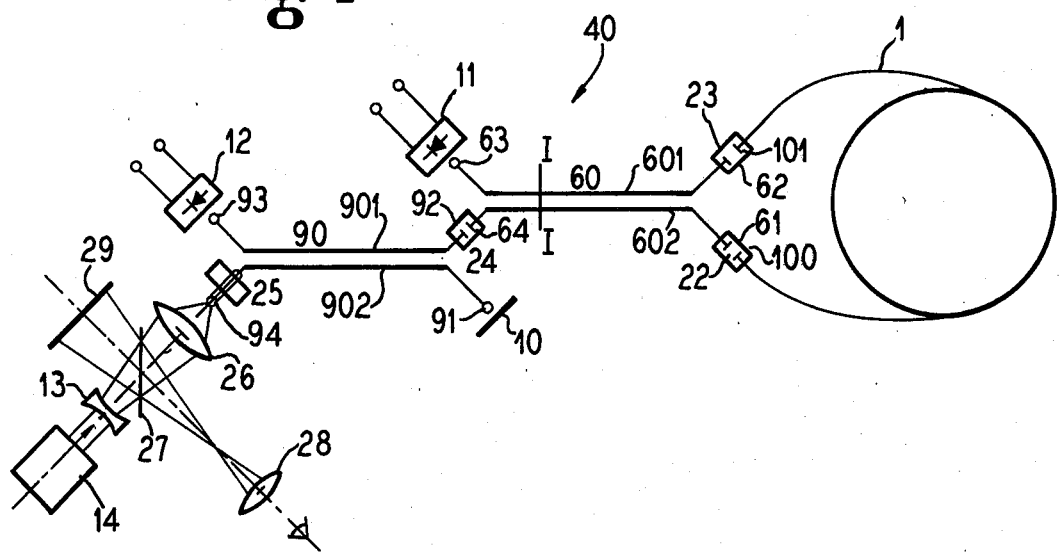
FIG. 1 is a diagrammatic illustration of an interferometer utilizing the improvement of the present invention.

The principles of the present invention are particularly useful in an interferometer generally indicated at 40 in FIG. 1. As illustrated the interferometer includes a single mode waveguide such as an optical fiber 1, which is wound into a coil and has its ends designated 100 and 101 respectively. Each of these ends forms surfaces for accepting light being coupled into the waveguide and for output coupling or displaying light existing or emerging from the waveguide 1.

As illustrated the means for projecting light from a light source 14 into the ends 100 and 101 and for sensing light leaving the ends 100 and 101 include optical directional coupler 60 and 90. The optical directional coupler 60 has four input/output ends 61, 62, 63 and 64 and the optical directional coupler 90 has four input/output ends 91, 92, 93 and 94. Directional coupler 60 is constructed of two coupling waveguides 601 and 602 and the optical directional coupler 90 is constructed of two coupling waveguides 901 and 902. The input/output ends 62, 63 of the coupler 60 are formed by the ends of the coupling waveguides 601 and the input ends 61 and 64 are formed by the coupling waveguide 602. In a similar manner, the coupler 90 has the input/output ends 92, 93 formed by the waveguide 901 while 91 and 94 are the ends of the waveguides 902.

Figure 3:
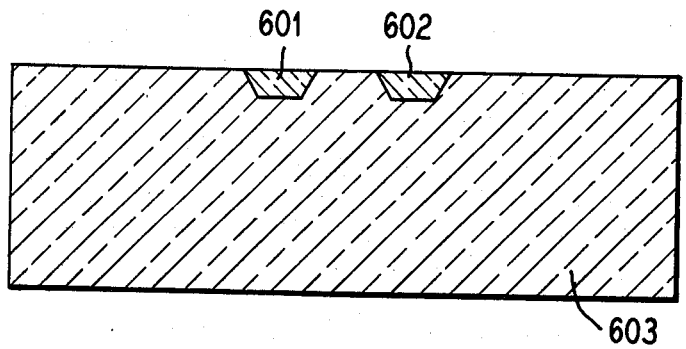
FIG. 3 shows the cross section of a directional coupler with optical strip waveguides.

FIG. 3 corresponds to the cross section I-I of coupler 60 marked in FIG. 1. The index of refraction of the waveguides 601 and 602 is somewhat greater than the index of refraction of the material of the substrate 603. Both waveguides are arranged such that there is a small separation between them such that a predetermined degree of coupling is achieved. The waveguides can be designed to propagate light waves with only one state of polarization and to exhibit high loss for the orthogonal polarization. In this coupler, therefore, only one state of polarization couples from one waveguide to the other. The coupler 90 in FIG. 1 may be of the same type as coupler 60.

Figure 4:
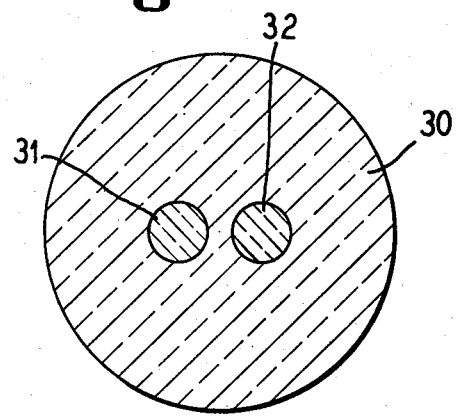
FIG. 4 is a cross sectional view of an optical single-mode fiber containing two cores (double core fiber). A section of such a fiber can be used as directional coupler.
Figure 5:
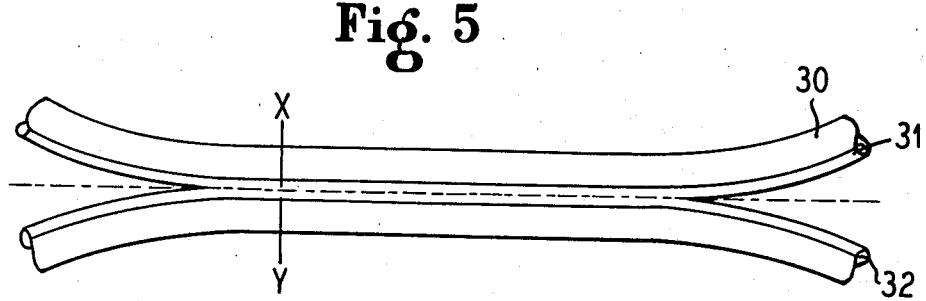
FIG. 5 shows a section of the double-core fiber with ends split.

FIG. 4 is a cross sectional view of an optical single-mode fiber containing two cores of two waveguides within one optical cladding (double core fiber). The index of refraction of the cores 31 and 32 is somewhat greater than the index of refraction of the cladding 30. The core separation is chosen such that a certain degree of coupling can be achieved. Sections of such a fiber can be used as directional couplers 60 and 90. To gain access to the waveguides at the end of the fiber sections the fiber ends can be split as shown in FIG. 5. The cross section x-y corresponds to FIG. 4. Couplers using sections of double core fibers usually work for any state of polarization and usually do not disturb polarization. The double core fiber has been discussed in copending U.S. patent application Ser. No. 002,537, based on German application No. 28 04 119.

The input/output end 61 in FIG. 1 is coupled to the end 100 of the waveguide 1 while the end 62 is coupled onto the end 101. Plugs 22 and 23, respectively, are provided as the coupling elements. The third end 64 of the directional coupler 60 is coupled onto an input/output end 92 of the additional directional coupler 90 so that a portion, such as a waveguide 901 of the coupler 90, is connected in series with the waveguide 602 of the coupler 60. The couplers 60 and 90, if they are couplers consisting of strip waveguides, may be arranged on the same substrate and the connection of ends 64 and 92 may be accomplished simply by a waveguides section. If, however, double core fiber sections are used as directional couplers 60 and 90, a certain type of connection between ends 64 and 92 is necessary. This connection may be a plug, or fiber ends for example may be welded together. The coupling waveguides and the plugs are preferably single-mode waveguides and single-mode plugs.

A light absorber 10 lies opposite the second input/output end 91 of the directional coupler 90. The third input/output end 94 of the directional coupler 90 is provided for coupling light into the coupler 90. This end 94 is secured in a fiber holding adjustment installation 25, which forms part of a means for coupling light into the optical coupler 60.

To provide light for the device 40, the light source 14, such as a laser, produces a beam which passes through an expansion optic 13, a beam splitting or dividing element 27 and a collecting optic or lens 26, which focuses the beam onto the end 94 of the waveguide 902 of the coupler 90. The expansion optic 13 and the collecting objective 26 forms means for purely real imaging of the light source 14 on the coupling surface of the end 94 and form the imaging optics of this means.

The beam divider element 27 is a mirror, which is arranged in the beam path of the light beam between the expansion objective 13 and the collecting optic or lens 26. This part of the optical installation enables a magnified observation of the input/output coupling surface of end 94 by using the collecting optic 26, a light absorber 29 and an ocular 28. The light absorber is arranged on the side of the beam divider mirror 27 onto which the light irradiates from the light source is reflected away from the beam divider and the ocular 28 lies on the opposite side of the beam divider to receive light reflected through the lens 26.

The light entrance window of a light sensitive element 11 is arranged or positioned opposite the fourth input/output end 63 of the optical directional coupler 60. Also, the light entrance window of an additional light sensitive element 12 lies opposite the fourth input/output end 93 of the additional optical directional coupler 90. Each of these light sensitive elements 11 and 12, which may be photo diodes, will receive a superimposed image of the light emerging from both ends 100 and 101 of the waveguide 1.

Figure 2:
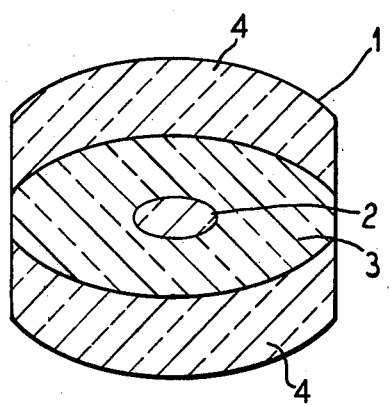
FIG. 2 is a cross sectional view of an optical fiber utilized as an improvement of the present invention.

In FIG. 2, a cross section of the fiber which can be used for fiber 1 is shown. The fiber has a core 2 surrounded by a cladding layer 3 and an outer jacket 4. The method of producing this fiber was disclosed in the article by V. Ramaswamy et al.

Although various minor modifications may be suggested by those versed in the art, it should be understood that I wish to embody within the scope of the patent granted hereon, all such modifications as reasonably and properly come within the scope of my contribution to the art.

I claim as my invention:

1. In a ring interferometer which includes a single mode light waveguide being wound in a coil and having a pair of ends, and means for projecting a light into each end and for sensing light leaving each end of the waveguide, the improvement comprising said means for projecting and sensing including at least one optical directional coupler having an input-output end coupled to at least one of the ends of the light waveguide of said coil, said coupler being composed of optical waveguides, which are capable of only conducting light of one polarization state.

2. In a ring interferometer according to claim 1, wherein the means for projecting and sensing includes a pair of said optical directional couplers, said couplers each being composed of a pair of optical waveguides which are capable of only conducting light of said one polarization state, one of said pairs of optical directional couplers having a pair of input-output ends being coupled to the two ends of said single mode light waveguide wound in a coil, and a second pair of input-output ends with one being coupled to a detector and the other end of the pair being coupled to the other optical coupler.

3. In a ring interferometer according to claim 1, wherein the means for projecting and sensing further includes at least one additional light waveguide being capable of conducting only light of the one polarization state being connected to an input-output end of said coupler.

4. In a ring interferometer according to claim 1, wherein the single mode light waveguide is a light waveguide capable of maintaining the one polarization state.

5. In a ring interferometer according to claim 4, wherein the means for projecting the sensing further includes at least one additional light waveguide coupled to the an input-output end of said coupler and being a light waveguide capable of conducting only light in said one polarization state.

6. In a ring interferometer according to claim 4, wherein the means for projecting and sensing includes a pair of said optical directional couplers which are capable of only conducting light of the one polarization state, each of said coupler having two pairs of input-output ends, one of said pair of couplers having one pair of input-output ends connected to the ends of said coil and the second pair of input-output ends have one end being connected to second coupler of said pair and the other end being connected to a detector.

* * * * *

US004354760B1

REEXAMINATION CERTIFICATE (3009th)

United States Patent [19]

Schiffner

[11] B1 4,354,760
[45] Certificate Issued Oct. 1, 1996

[54] RING INTERFEROMETER COMPRISING A SINGLE-MODE LIGHT WAVEGUIDE

[75] Inventor: Gerhard Schiffner, Munich, Germany

[73] Assignee: Litef GmbH, Freiburg, Germany

Reexamination Request:
No. 90/004,086, Dec. 22, 1995

Reexamination Certificate for:
| | |
|---|---|
| Patent No.: | 4,354,760 |
| Issued: | Oct. 19, 1982 |
| Appl. No.: | 132,142 |
| Filed: | Mar. 20, 1980 |

[30] Foreign Application Priority Data

Mar. 21, 1979 [DE] Germany .................... 2911129

[51] Int. Cl.$^6$ .................... G01C 19/72; G01B 9/02; G01P 3/36
[52] U.S. Cl. .................... 356/350; 385/32
[58] Field of Search .................... 356/350

[56] References Cited

U.S. PATENT DOCUMENTS

| | | |
|---|---|---|
| 3,622,244 | 11/1971 | Chitayat . |
| 4,039,260 | 8/1977 | Redman . |
| 4,135,822 | 1/1979 | Ezekiel . |
| 4,302,107 | 11/1981 | Schiffner et al. .................... 356/350 |

FOREIGN PATENT DOCUMENTS

| | | |
|---|---|---|
| 1534841 | 6/1968 | France . |
| 2334967 | 7/1977 | France . |
| 2409518 | 6/1979 | France . |
| 1807247 | 5/1970 | Germany . |
| 2209397 | 9/1972 | Germany . |
| 1126744 | 9/1968 | United Kingdom . |
| 1210280 | 10/1970 | United Kingdom . |
| 1258172 | 12/1971 | United Kingdom . |
| 1345899 | 2/1974 | United Kingdom . |
| 1375091 | 11/1974 | United Kingdom . |
| 1388418 | 3/1975 | United Kingdom . |
| 1397443 | 6/1975 | United Kingdom . |

OTHER PUBLICATIONS

A. Simon and R. Ulrich, "Evolution of Polarization Along a Single–Mode Fiber", *Applied Physics Letters*, vol. 31, No. 8, pp. 517–520 (Oct. 15, 1977).

R. H. Stolen et al., "Linear Polarization in Birefringent Single–Mode Fibers", *Appl. Phys. Lett.*, vol. 33, No. 8, pp. 699–701 (Oct. 1978).

V. Vali, R. W. Shorthill and M. F. Berg, "Fresnel–Fizeau Effect in a Rotating Optical Fiber Ring Interferometer", *Applied Optics*, vol. 16, No. 10, pp. 2605–2607 (Oct. 1977).

V. Ramaswamy et al., "Single Polarization Optical Fibers: Exposed Cladding Technique", *Appl. Phys. Lett.*, vol. 33, No. 9, pp. 814–816 (Nov. 1, 1978).

E. A. J. Marcatili, "Dielectric Rectangular Waveguide and Directional Coupler for Integrated Optics", *The Bell System Technical Journal*, vol. 48, pp. 2071–2102 (Sep. 1969).

Alekseev, E. I., et al., "Laser Interferometers Using Fiber Light Guides", *Kvantovaya Electronika* 4, No. 9, pp. 2029–2030 (1977).

Vali, V. and Shorthill, R., "Fiber Ring Interferometer", *Applied Optics*, vol. 15, No. 5, pp. 1099–1100 (May 1976).

R. Kingslake, ed., "Applied Optics and Optical Engineering", vol. IV, Optical Instruments—Section I, pp. 309–315, and particularly p. 315, lines 4–7; Section II, pp. 315–333 (Academic Press, New York and London) 1967.

B. S. Kawasaki, K. O. Hill, "Low–Loss Access Coupler for Multimode Optical Fiber Distribution Networks", *Applied Optics*, vol. 16, No. 7, pp. 1794–1795 (Jul. 1977).

E. J. Post, "Sagnac Effect", *Reviews of Modern Physics*, vol. 39, No. 2, pp. 475–493 (Apr. 1967).

(List continued on next page.)

*Primary Examiner*—Samuel A. Turner

[57] ABSTRACT

A ring interferometer which has at least one single mode light waveguide wound in a coil characterized by the light waveguide maintaining one polarization state. If the interferometer includes directional couplers or additional light waveguides, each of these are constructed of waveguides which conduct only one polarization state.

OTHER PUBLICATIONS

P. Baues, "Integrated Optical Directional Couplers", *Elektronik-Anzeiger*, 9, pp. 19–22 (1977) (English translation provided).

F. M. E. Sladen, D. N. Payne & M. J. Adams, "Determination of Optical Fiber Refractive Index Profiles by a Near-Field Scanning Technique", *Applied Physics Letters*, vol. 28, No. 5, pp. 255–258 (Mar. 1, 1976).

H. J. Arditty, "Fiber-Optic Rotation Sensors. Bibliography", *Fiber-Optic Rotation Sensors and Related Technologies*, Proceedings of the First International Conference MIT, Cambridge, Mass., Nov. 9–11, 1981, pp. 27–42 (Springer-Verlag 1982).

V. Vali and R. W. Shorthill, "Ring Interferometer 950 m Long", *Applied Optics*, vol. 16, No. 2, pp. 290–291 (Feb. 1977).

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

* * * * *